(12) United States Patent
Onde et al.

(10) Patent No.: US 11,552,777 B2
(45) Date of Patent: Jan. 10, 2023

(54) TIME DOMAINS SYNCHRONIZATION IN A SYSTEM ON CHIP

(71) Applicants: STMicroelectronics (Grenoble 2) SAS, Grenoble (FR); STMicroelectronics (Rousset) SAS, Rousset (FR)

(72) Inventors: Vincent Onde, Fuveau (FR); Diarmuid Emslie, Grenoble (FR); Patrick Valdenaire, Roquefort les Pins (FR)

(73) Assignees: STMicroelectronics (Rousset) SAS, Rousset (FR); STMicroelectronics (Grenoble 2) SAS, Grenoble (FR)

( * ) Notice: Subject to any disclaimer, the term of this patent is extended or adjusted under 35 U.S.C. 154(b) by 0 days.

(21) Appl. No.: 17/457,354

(22) Filed: Dec. 2, 2021

(65) Prior Publication Data
US 2022/0239459 A1 Jul. 28, 2022

(30) Foreign Application Priority Data

Jan. 26, 2021 (FR) .................................... 2100697

(51) Int. Cl.
*H04L 7/00* (2006.01)
(52) U.S. Cl.
CPC .................................. *H04L 7/0012* (2013.01)
(58) Field of Classification Search
CPC ..... H04L 7/0012; H04L 7/0033; H04L 69/08; H04L 9/40; G05B 19/4185; H04J 3/0655; H04J 3/0644; H04J 3/0658; H04W 56/0015; H04N 21/43637
USPC ................ 375/356, 357, 371, 373, 375, 376
See application file for complete search history.

(56) References Cited

U.S. PATENT DOCUMENTS

| | | | | |
|---|---|---|---|---|
| 9,979,998 | B1* | 5/2018 | Pogue | H04N 21/43637 |
| 11,424,902 | B2* | 8/2022 | Chattopadhyay | H04L 7/0033 |
| 2002/0065940 | A1* | 5/2002 | Suzuki | H04L 9/40 709/248 |
| 2017/0237512 | A1* | 8/2017 | Galea | H04J 3/0644 370/350 |
| 2017/0359139 | A1* | 12/2017 | Butterworth | H04L 69/08 |
| 2018/0124731 | A1* | 5/2018 | Klotchkov | H04W 56/0015 |
| 2018/0227067 | A1 | 8/2018 | Hu et al. | |
| 2019/0165927 | A1 | 5/2019 | Wang | |
| 2020/0133330 | A1 | 4/2020 | Bordogna et al. | |
| 2020/0166911 | A1* | 5/2020 | Schneider | G05B 19/4185 |
| 2020/0166912 | A1* | 5/2020 | Schneider | H04J 3/0658 |
| 2022/0045836 | A1* | 2/2022 | Hioki | H04J 3/0655 |

OTHER PUBLICATIONS

Texas Instruments, "AM65XX Time Synchronization Architecture", Applicant Report, SPRACP7, Oct. 2019, 13 pages.

* cited by examiner

*Primary Examiner* — Phuong Phu
(74) *Attorney, Agent, or Firm* — Slater Matsil, LLP (57) ABSTRACT

A method for synchronizing a first time domain with a second time domain of a system on chip includes a detection of at least one periodic trigger event generated in the first time domain, the second time domain or in a third time domain; acquisitions, made at the instants of the at least one trigger event, of the current timestamp values representative of the instantaneous states of the time domain(s) other than the trigger time domain; a comparison, made in the third time domain, between differential durations between current timestamp values which are respectively acquired successively; and a synchronization of the second time domain with the first time domain, on the basis of the comparison.

20 Claims, 7 Drawing Sheets

FIG.4

TIME DOMAINS SYNCHRONIZATION IN A SYSTEM ON CHIP

CROSS-REFERENCE TO RELATED APPLICATIONS

This application claims the benefit of French Application No. 2100697, filed on Jan. 26, 2021, which application is hereby incorporated herein by reference.

TECHNICAL FIELD

Embodiments and implementations relate to systems on chip, and in particular the synchronization of time domains in a system on chip.

BACKGROUND

In electronic devices comprising several microprocessors or microcontrollers, it is necessary to share a common vision of time between them.

A system on chip is usually designated as a system embedded in the same integrated circuit including a microprocessor or microcontroller and other devices, such as for example at least one communication interface.

The shared time can be a global time, that is to say an absolute time for example resulting from a real date, or a local time, called network time, not necessarily having an absolute reference but identical to all the elements of a network.

The time information exchanged must be precise, for example of a level below a microsecond, and synchronized, so that distributed processes can be started simultaneously, such as for example a multi-axis motion control for robotics.

The sharing of time information is done through a communication interface, such as a Peripheral Component Interconnect express "PCIe" interface, or a wired network interface usually called "Ethernet." PCIe and Ethernet interfaces are well known to a person skilled in the art.

Communication interfaces are typically intended to operate under specific communication protocols, and communication protocols may provide for specific time information sharing.

Consequently, each communication interface is typically adapted for a specific time sharing protocol and this is referred to as "time domains" for the different visions of time obtained by the different communication interfaces of a system on chip.

In particular, PCIe interfaces provide for sharing time information according to a process called Precision Time Measurement (usually "PTM") wherein a "master" device called Root Complex (usually "RC") shares time information of a common clock on which the "slave" devices called End Points (usually "EP") are synchronized; and, the Ethernet interfaces provide for sharing time information according to a process called Precision Time Protocol (usually "PTP"), to share a common clock between end points.

The shared time information can be coded differently depending on the communication protocol used, for example the PTM protocol can provide a clock encoded by a 64-bit binary word incremented at 250 MHz, while the PTP protocol can provide a digital value representative of the nanoseconds on 32 bits, and a digital value representative of the seconds on 32 bits.

Conventional techniques for sharing time information and synchronizing systems on chip have difficulties insofar as the time domains used may be disciplined by different protocols and not directly compatible with each other, such as for example the PTM protocols of PCIe interfaces and the PTP protocols of Ethernet interfaces.

Moreover, it is desirable not to introduce changes in the communication interfaces, since they typically have the need to be compatible with third-party devices, as defined by standards or consensus.

There is therefore a need to be able to synchronize different time domains in the same system on chip.

SUMMARY

According to one aspect, provision is made of a method for synchronizing a first time domain of a first device with a second time domain of a second device. The method comprises a detection of at least one periodic trigger event generated in at least one trigger time domain selected from the first time domain, the second time domain and a third time domain of a third device. The method comprises acquisitions, made at the instants of detection of the at least one trigger event, of the current timestamp values representative of the instantaneous states of the first time domain, of the second time domain and of the third time domain other than the at least one trigger time domain. The method comprises a comparison, made in the third time domain, between differential durations between current timestamp values which are respectively acquired successively. The method comprises a synchronization of the second time domain with the first time domain, on the basis of the comparison.

In other words, the method according to this aspect uses the third time domain as an intermediary in order to measure a possible shift in the lapse of time between the point of vision of the first time domain and the point of vision of the second time domain, which are potentially not directly comparable with each other.

Indeed, the comparison of the elapsed time between two timestamp values of a time domain with the elapsed duration in the third time domain between two trigger events, or with the elapsed duration between two timestamp values of at least one other time domain, allows having information on the difference in the speed of lapse of time between the two considered domains, that is to say between the time domain providing the timestamp value and the time domain providing the trigger events, or between the two time domains providing timestamp values at the instants defined by the trigger events.

Furthermore, the method according to this aspect does not introduce any functional or structural modification to the elements of the first time domain or of the second time domain, but advantageously uses timestamp information usually provided to synchronize the time domains, from the third-party third time domain.

For example, the acquisitions of the current timestamp values can be made at the same instants of detection of the same periodic trigger event, or at different instants of detection of various periodic trigger events.

According to one implementation, the first time domain is defined by a precision time measurement protocol "PTM" of a peripheral component interconnect express "PCIe" interface, the second time domain is defined by a precision time protocol "PTP" of a network interface "Ethernet," and the third time domain is clocked by a free running local clock adapted for software operations.

Indeed, a problem exists in particular in conventional systems on chip using both a time domain defined by PTM, and a time domain defined by PTP, given that the PCIe and Ethernet interfaces are typically used and consequently very widespread.

This implementation thus allows resolving this particular and conventionally very widespread problem.

According to one implementation, the at least one trigger time domain comprises the first time domain, and the at least one trigger event generated in the first time domain occurs when a condition is verified on a transition of at least one bit of a current timestamp value representative of the instantaneous state of the first time domain, each bit of the current timestamp value being communicated on a dedicated channel of a timestamp bus.

On the one hand, the trigger events can be conditioned by a combination of bits of the timestamp bus, which allows constructing "complex" trigger events having a periodicity which is not available in the signals passing through the timestamp bus as such. This can for example allow constructing an optimized period for a particular processing in the third time domain.

On the other hand, it should be noted that the communication of each bit of the current timestamp value on a dedicated channel of a timestamp bus is used in particular by PCIe interfaces using the PTM.

According to one implementation, the at least one trigger time domain does not comprise the first time domain, each bit of the current timestamp value representative of the instantaneous state of the first time domain is communicated on a dedicated channel of a timestamp bus, and the acquisition of the current value representative of the instantaneous state of the first time domain comprises a loading of a latch with the bits present on each channel of the timestamp bus, the loading of the latch being controlled at the instants of detection of the at least one periodic trigger event.

Here again, it will be noted that the communication of each bit of the current timestamp value on a dedicated channel of a timestamp bus is used in particular by the PCIe interfaces using the PTM, and this implementation allows simply retrieving the current timestamp value of the first time domain, without modifying the structure or the operation of the first time domain.

According to one implementation, the at least one trigger time domain comprises the second time domain, and the at least one trigger event generated in the second time domain is detected when a periodic signal is generated in the second time domain.

Thus, in the case where the at least one time domain comprises both the first time domain and the second time domain, the method comprises acquisitions of first current timestamp values and respectively of second current timestamp values representative of the instantaneous states of the third time domain, made at the instants of detection of the first trigger events originating from the first time domain and respectively at the instants of detection of the second trigger event originating from the second time domain. The comparison is made between the differential durations between the first current timestamp values, and the differential durations between the second current timestamp values.

And, in the case where the at least one second time domain comprises only the second time domain, the method comprises acquisitions of current timestamp values representative of the instantaneous states of the first time domain as well as acquisitions of current timestamp values representative of the instantaneous states of the third time domain, at the instants of detection of the second trigger events originating from the second time domain. The comparison is made between the differential durations between the respective current timestamp values.

According to another aspect, provision is made of a system, for example incorporated in an integrated manner in a system on chip, including a first device comprising a first counter configured to have a current timestamp value representative of the instantaneous state of a first time domain, a second device comprising a second counter configured to have a current timestamp value representative of the instantaneous state of a second time domain, and a third device comprising a local clock generator configured to clock a third time domain. The third device includes a synchronization module configured to detect at least one periodic trigger event generated in at least one trigger time domain selected from the first time domain, the second time domain and the third time domain. The synchronization module is configured to acquire, at the instants of detection of the at least one trigger event, the current timestamp values representative of the first time domain, of the second time domain and of the third time domain other than the at least one trigger time domain. The synchronization module is configured to compare differential durations between current timestamp values which are respectively acquired successively. The synchronization module is configured to generate a control adapted for synchronizing the second time domain with the first time domain, on the basis of the comparison.

The synchronization module can be configured to acquire the current timestamp values at the same instants of detection of the same trigger event, or at different instants of detection of different trigger events.

According to one embodiment, the first device comprises a peripheral component interconnect express "PCIe" interface configured to define the first time domain by a precision time measurement "PTM" protocol, the second device comprises a network interface "Ethernet" configured to define the second time domain by a precision time protocol "PTP," and the local clock generator of the third device is adapted to clock software operations.

According to one embodiment, the at least one trigger time domain comprises the first time domain, the first counter is configured to communicate each bit of the current timestamp value on a dedicated channel of a timestamp bus, and the synchronization module is configured to detect the at least one trigger event generated in the first time domain, when a condition is verified on a transition of at least one bit on the respective channel(s) of the timestamp bus.

According to one embodiment, the at least one trigger time domain does not comprise the first time domain, the first counter is configured to communicate each bit of the current timestamp value on a dedicated channel of a timestamp bus, and the synchronization module includes a latch on the timestamp bus and is configured to acquire the current value representative of the instantaneous state of the first time domain by controlling a loading of the latch, at the instant of the at least one trigger event, with the bits present on each channel of the timestamp bus.

According to one embodiment, the at least one trigger time domain comprises the second time domain (optionally in addition to the first time domain), and the synchronization module is configured to detect the at least one trigger event generated in the second time domain, when a periodic signal is generated in the second time domain.

BRIEF DESCRIPTION OF THE DRAWINGS

Other advantages and features of the invention will become apparent upon examining the detailed description of implementations and embodiments, which are in no way limiting, and the appended drawings, wherein.

DETAILED DESCRIPTION OF ILLUSTRATIVE EMBODIMENTS

FIGS. 1A, 1B, 1C and 1D illustrate four possible alternatives of an SoC system including a first device DIS1 comprising a first counter TMR1 configured to have a current timestamp value representative of the instantaneous state of a first time domain DMN1; a second device DIS2 comprising a second counter TMR2 configured to have a current timestamp value representative of the instantaneous state of a second time domain DMN2; a third device DIS3 comprising a third counter TMR3 configured to have a current timestamp value representative of the instantaneous state of a third time domain DMN3, and synchronization module MSYNC configured to synchronize SYNC the second time domain DMN2 on the first time domain DMN1.

The system SoC can be integrated in the same integrated circuit, usually called in this case "system on chip," or in systems on chips which are different and interconnected by wire links, each including at least one of the first, second and third device DIS1, DIS2, DIS3.

In the following, the non-limiting example where the three devices DIS1, DIS2, DIS3 and the respective time domains DMN1, DMN2, DMN3, belong to the same system on chip SoC will be considered.

Current timestamp values are digital representations of an instantaneous time, that is to say, "a date" in the broad sense. In the system on chip SoC, the different timestamp "dates" used can have an amplitude (that is to say maximum value) of a great number of years (hundred(s) of years) and precision (that is to say minimum variation) of the order of a nanosecond or even less.

Each time domain DMN1, DMN2, DMN3 is clocked by a respective local clock signal generator clk1, clk2, clk3. The local clock signal generators clk1, clk2, clk3 can be produced in the form of local oscillators, such as for example usually crystal oscillators (for example quartz) with a phase locked loop, and optionally compensated in temperature; but also, other types of oscillators, less common in the field of clock generation, such as variable frequency oscillators, voltage controlled oscillators, phase locked loops, or else analogue or digital frequency synthesizers.

According to a particular and non-limiting example, the third device DIS3 can comprise or constitute a microprocessor or a microcontroller, that is to say more broadly a calculation unit adapted for implementing software operations, and the local clock generator clk3 of the third device DIS3 is in particular intended to clock the software operations.

The synchronization module MSYNC can be implemented by hardware belonging to the third device DIS3, or by software implemented in the third device DIS3.

In the representations of FIGS. 1A, 1B, 1C and 1D, the local clock generators clk1, clk2, clk3 integrate the respective devices DIS1, DIS2, DIS3, but could come from sources which are external but belonging to the respective time domains DMN1, DMN2, DMN3.

According to a particular and non-limiting example (see below in relation to FIGS. 2 to 4), the first device DIS1 can comprise or constitute a peripheral component interconnect express "PCIe" interface, and the specifications of which, well known to a person skilled in the art, are managed and developed by the PCI-SIG ("PCI Special Interest Group") consortium.

According to a particular and non-limiting example (described below in relation to FIGS. 2 to 4), the second device DIS2 may comprise or constitute a wired physical network interface "Ethernet," for example as defined by the standard IEEE802.3 and its variants, well known to a person skilled in the art.

However, the first device DIS1 and the second device DIS2 may comprise or constitute other technologies (typically communication interfaces) adapted to exchange time information in order to synchronize distinct time domains, such as in particular the CAN (for "Controller Area Network") interfaces and the FDCAN (for "Flexible Data CAN") or TTCAN (for "Time Triggered CAN") variants, but also 4G, 5G, LTE communications which have synchronization possibilities of the order of the microsecond.

Figure 1A:
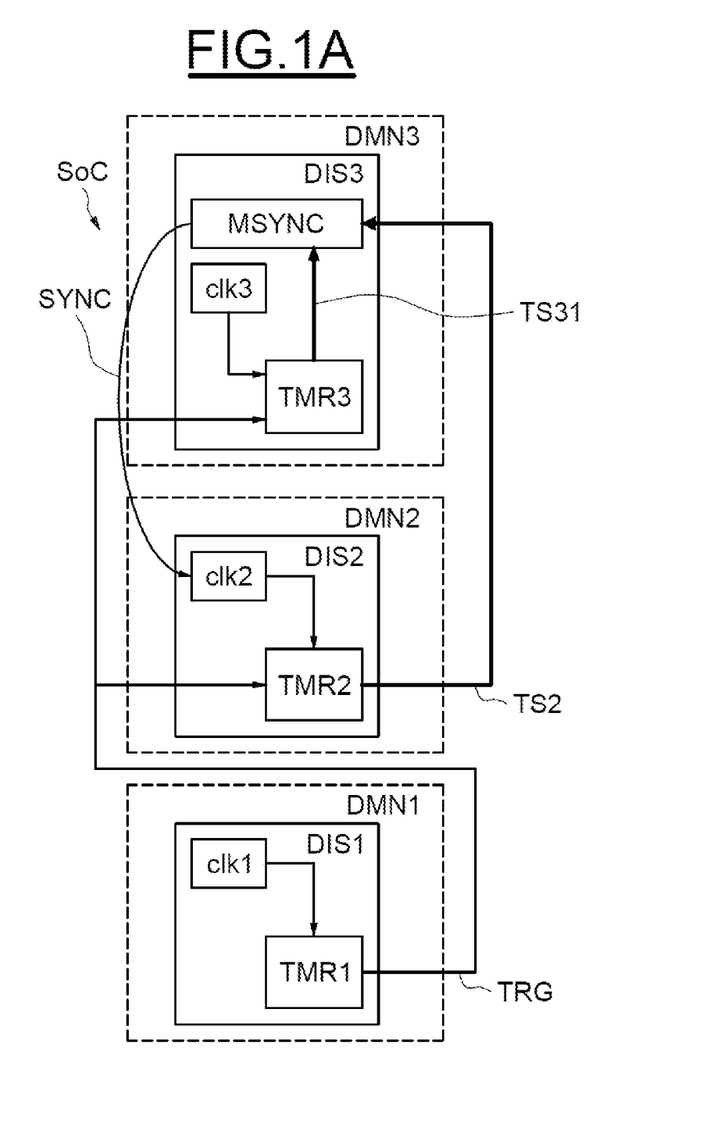
FIG. 1A illustrates a first alternative of an SoC system.

FIG. 1A illustrates a first alternative of the configuration of the synchronization module MSYNC, integrated in the third device DIS3, for synchronizing SYNC the second time domain DMN2 on the first time domain DMN1 of the system on chip SoC.

In this first alternative, the synchronization module MSYNC is configured to detect a trigger event TRG generated periodically in the first time domain DMN1. The first time domain DMN1 is called in this regard "trigger time domain."

The duration of the period of the trigger event, considered in the first time domain DMN1, can be known by the synchronization module MSYNC by construction.

The synchronization module MSYNC is configured to acquire the current timestamp values TS2 representative of the instantaneous states of the second time domain DMN2, at the successive instants of detection of the periodic trigger event TRG.

The synchronization module MSYNC is configured to compare a differential duration between successive trigger events TRG with a differential duration between current timestamp values TS2 which are respectively acquired successively.

"Differential duration" means the value of the difference between two of the considered measurements, that is to say the difference between the timestamp values, or the time difference between trigger events.

The differential duration between successive trigger events TRG is for example made with prior knowledge of their periodicity in the first time domain DMN1, and/or by a measurement of the differential duration between current timestamp values TS31 of the third time domain DMN3 acquired at the moments of detection of trigger events TRG originating from the first time domain DMN1.

Indeed, on the one hand, the synchronization module MSYNC has acquired information on the lapse of time in the first time domain DMN1 by the instants of detection of the periodic trigger events TRG. Thus, the synchronization module MSYNC can for example detect a slowing down of the lapse of time in the first time domain DMN1 if the period between two detections of the trigger event TRG increases.

On the other hand, the synchronization module MSYNC has acquired information on the lapse of time in the second time domain DMN2 by the current timestamp values TS2. The difference between timestamp values TS2 indeed provide the duration elapsed between the corresponding trigger events, this time considered in the second time domain DMN2.

Finally, the synchronization module MSYNC is configured to generate a control SYNC adapted for synchronizing the second time domain DMN2 with the first time domain DMN1, on the basis of the comparison.

In particular, the control SYNC is adapted to adjust the frequency, and optionally the phase, of the local clock signal generated by the local clock generator clk2 of the second time domain DMN2.

Indeed, from the information on the lapse of time in the first time domain DMN1 and the information on the lapse of time in the second time domain DMN2, the synchronization module MSYNC can calculate a correction to be applied in the second time domain DMN2 so that it corresponds to the first time domain DMN1.

For example, if the lapse of time in the first time domain DMN1 has slowed down, the control SYNC may comprise a reduction in the frequency of the clock generated by the local clock generator clk2 of the second time domain DMN2.

According to another example of synchronization, if the duration between two trigger events TRG, obtained by the difference between the timestamp values TS2 and therefore considered in the second time domain DMN2, is different from the duration between the corresponding trigger events TRG, considered in the first time domain DMN1 with prior knowledge of the periodicity of the trigger events TRG or else considered in the third time domain DMN3, the control SYNC can adjust the frequency of the clock clk2 of the second time domain DMN2, to equalize the measurement of time in the second time domain DMN2 to the measurement of time in the first time domain DMN1.

Indeed, the synchronization module MSYNC is capable of identifying a linear relationship (for example in "y=ax+b") between the time ("y") of the first time domain DMN1 and the time ("x") of the second time domain DMN1. The control SYNC allows applying the proportional correction ("a") and offset ("b") parameters.

Figure 1B:
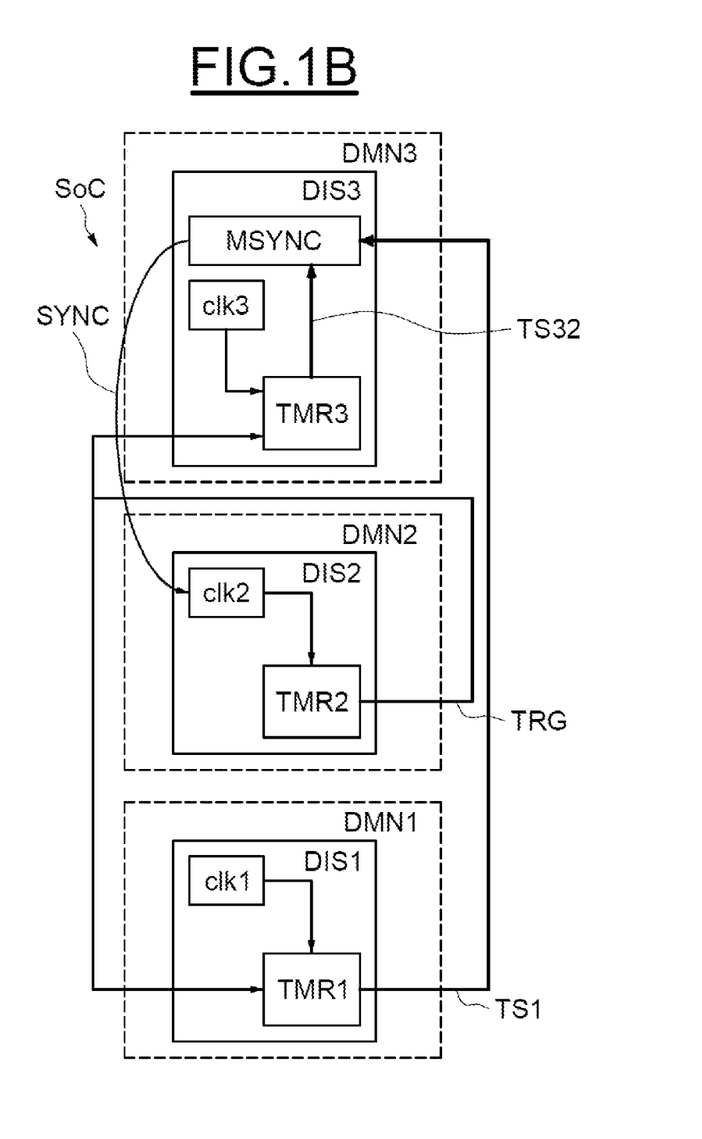
FIG. 1B illustrates a second alternative of an SoC system.

FIG. 1B illustrates a second alternative of the configuration of the synchronization module MSYNC, integrated in the third device DIS3, for synchronizing SYNC the second time domain DMN2 on the first time domain DMN1 of the system on chip SoC.

In this second alternative, the synchronization module MSYNC is configured to detect a trigger event TRG generated periodically in the second time domain DMN2. The second time domain DMN2 is called in this regard "trigger time domain."

The synchronization module MSYNC is configured to acquire the current timestamp values TS1 representative of the instantaneous states of the first time domain DMN1, at the successive instants of detection of the periodic trigger event TRG.

The synchronization module MSYNC is configured to compare a differential duration between successive trigger events TRG with a differential duration between current timestamp values TS1 which are respectively acquired successively.

The differential duration between successive trigger events TRG is for example made with prior knowledge of their periodicity in the second time domain DMN2, and/or by a measurement of the differential duration between current timestamp values TS32 of the third time domain DMN3 acquired at the moments of detection of trigger events TRG from the second time domain DMN2.

Finally, the synchronization module MSYNC is configured to generate a control SYNC adapted for synchronizing the second time domain DMN2 with the first time domain DMN1, on the basis of the comparison.

Here again, the synchronization module MSYNC has acquired information representative of the first time domain DMN1 and of the second time domain DMN2. The differential durations calculated from this information will allow identifying a relationship between the lapse of time in the second time domain DMN2 compared to the lapse of time in the first time domain DMN1, in order to set the control SYNC of synchronization of the second time domain DMN2.

Figure 1C:
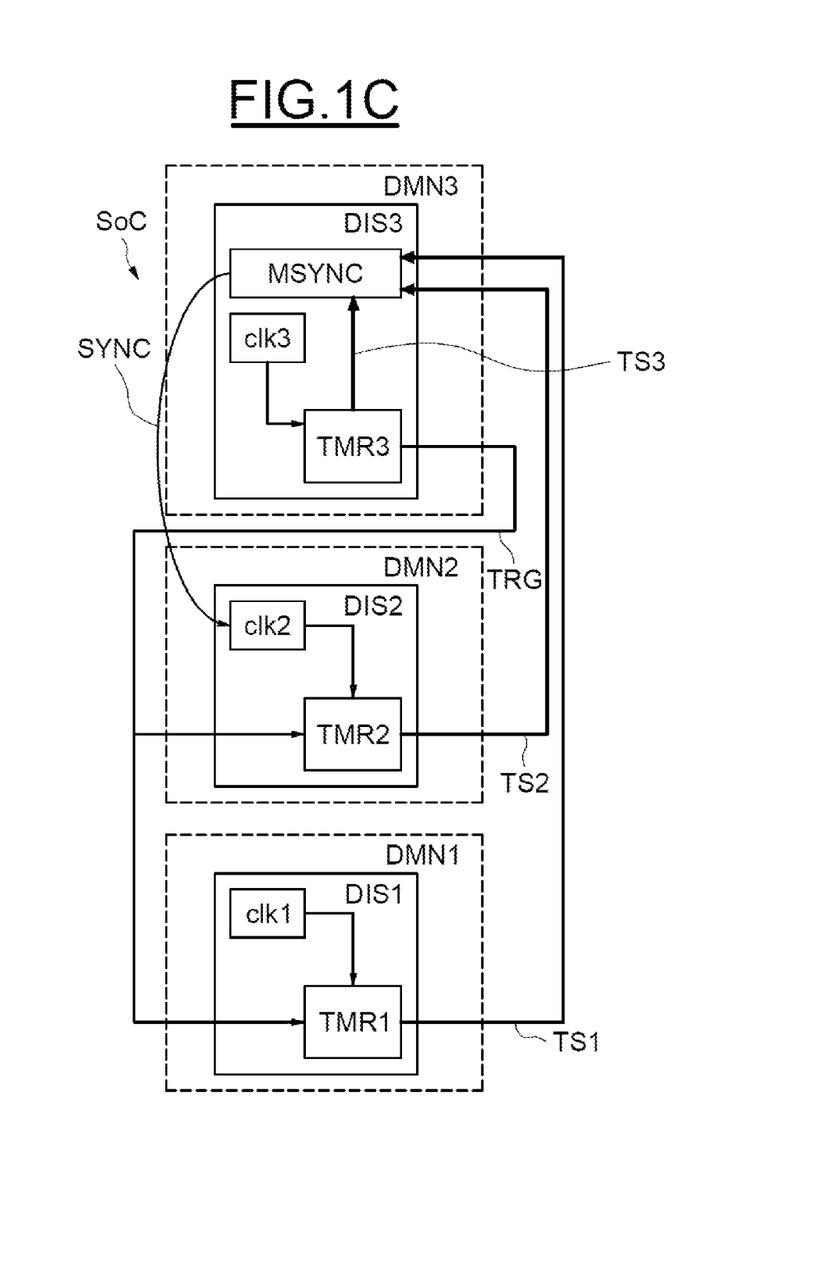
FIG. 1C illustrates a third alternative of an SoC system.

FIG. 1C illustrates a third alternative of the configuration of the synchronization module MSYNC, integrated in the third device DIS3, for synchronizing SYNC the second time domain DMN2 on the first time domain DMN1 of the system on chip SoC.

In this third alternative, the synchronization module MSYNC is configured to detect a trigger event TRG generated periodically in the third time domain DMN3. The third time domain DMN3 is called in this regard "trigger time domain."

For clarification of the use of the terms, given that the synchronization module MSYNC is part of the third device DIS3 of the third time domain DMN3, it could be considered that the synchronization module MSYNC is configured to itself generate the periodic trigger events TRG. However, strictly speaking, the trigger events TRG come from a time management mechanism TMR3 (usually "timer") from the local clock clk3, and the trigger events TRG, as such, are not generated directly by the synchronization module MSYNC. Thus, it is considered that the trigger events TRG are generated by the third device DIS3, and that the synchronization module MSYNC of the third device DIS3 is configured to detect the trigger events TRG.

The synchronization module MSYNC is configured to acquire the current timestamp values TS1 representative of the instantaneous states of the first time domain DMN1, at the successive instants of detection of the periodic trigger event TRG, and to acquire the current timestamp values TS2 representative of the instantaneous states of the second time domain DMN2, at the successive instants of detection of the periodic trigger event TRG.

It will be noted that the acquisitions TS1, TS2 can be made at the same instants of detection of the same periodic trigger event TRG, or at different instants of detection of various periodic trigger events, in particular, a trigger event can be respectively assigned to each of the first and second devices DIS1, DIS2.

The synchronization module MSYNC is configured to compare the differential duration between the current timestamp values TS1 of the first time domain DMN1 acquired successively, with the differential duration between the current timestamp values TS2 of the second time domain DMN2 acquired successively.

The comparison can further take into account the differential duration between the corresponding successive trigger events TRG, in particular in the case where several distinct trigger events are used.

Finally, the synchronization module MSYNC is configured to generate a control SYNC adapted for synchronizing the second time domain DMN2 with the first time domain DMN1, on the basis of the comparison.

Here again, the synchronization module MSYNC has acquired information representative of the first time domain DMN1 and the second time domain DMN2 (that is to say the current timestamp values TS1, ST2). The differential durations calculated from this information will allow identifying a relationship between the lapse of time in the second time domain DMN2 compared to the lapse of time in the first time domain DMN1, in order to set the control SYNC of synchronization of the second time domain DMN2.

Figure 1D:
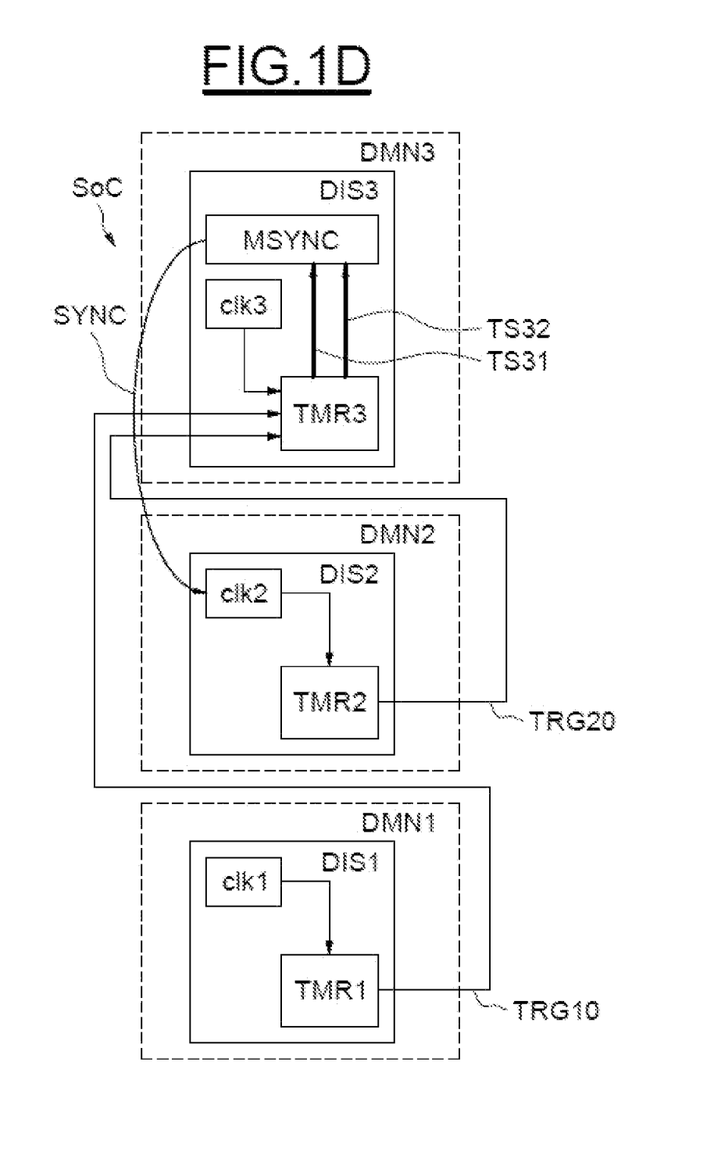
FIG. 1D illustrates a fourth alternative of an SoC system.

FIG. 1D illustrates a fourth alternative of the configuration of the synchronization module MSYNC, integrated in the third device DIS3, for synchronizing SYNC the second time domain DMN2 on the first time domain DMN1 of the system on chip SoC.

In this fourth alternative, the synchronization module MSYNC is configured to detect a first trigger event TRG10 generated periodically in the first time domain DMN1 and a second trigger event TRG20 generated periodically in the second time domain DMN2. The first and the second time domains DMN1, DMN2 are called in this regard "trigger time domains."

The synchronization module MSYNC is configured to acquire the first current TS31 timestamp values representative of the instantaneous states of the third time domain DMN3, at the successive instants of detection of the first periodic trigger event TRG10.

Similarly, the synchronization module MSYNC is configured to acquire second current timestamp values TS32 representative of the instantaneous states of the third time domain DMN3, at the successive instants of detection of the second periodic trigger event TRG20.

The synchronization module MSYNC is configured to compare the differential durations between the first current timestamp values TS31 which are respectively acquired successively, with the differential durations between the second current timestamp values TS32 which are respectively acquired successively.

Finally, the synchronization module MSYNC is configured to generate a control SYNC adapted for synchronizing the second time domain DMN2 with the first time domain DMN1, on the basis of the comparison.

Here again, the synchronization module MSYNC has acquired information representative of the first time domain DMN1 and of the second time domain DMN2, from the point of vision of the third time domain DMN3. The differential durations calculated from this information will allow identifying a relationship between the lapse of time in the second time domain DMN2 compared to the lapse of time in the first time domain DMN1, in order to set the control SYNC of synchronization of the second time domain DMN2.

Figure 2:
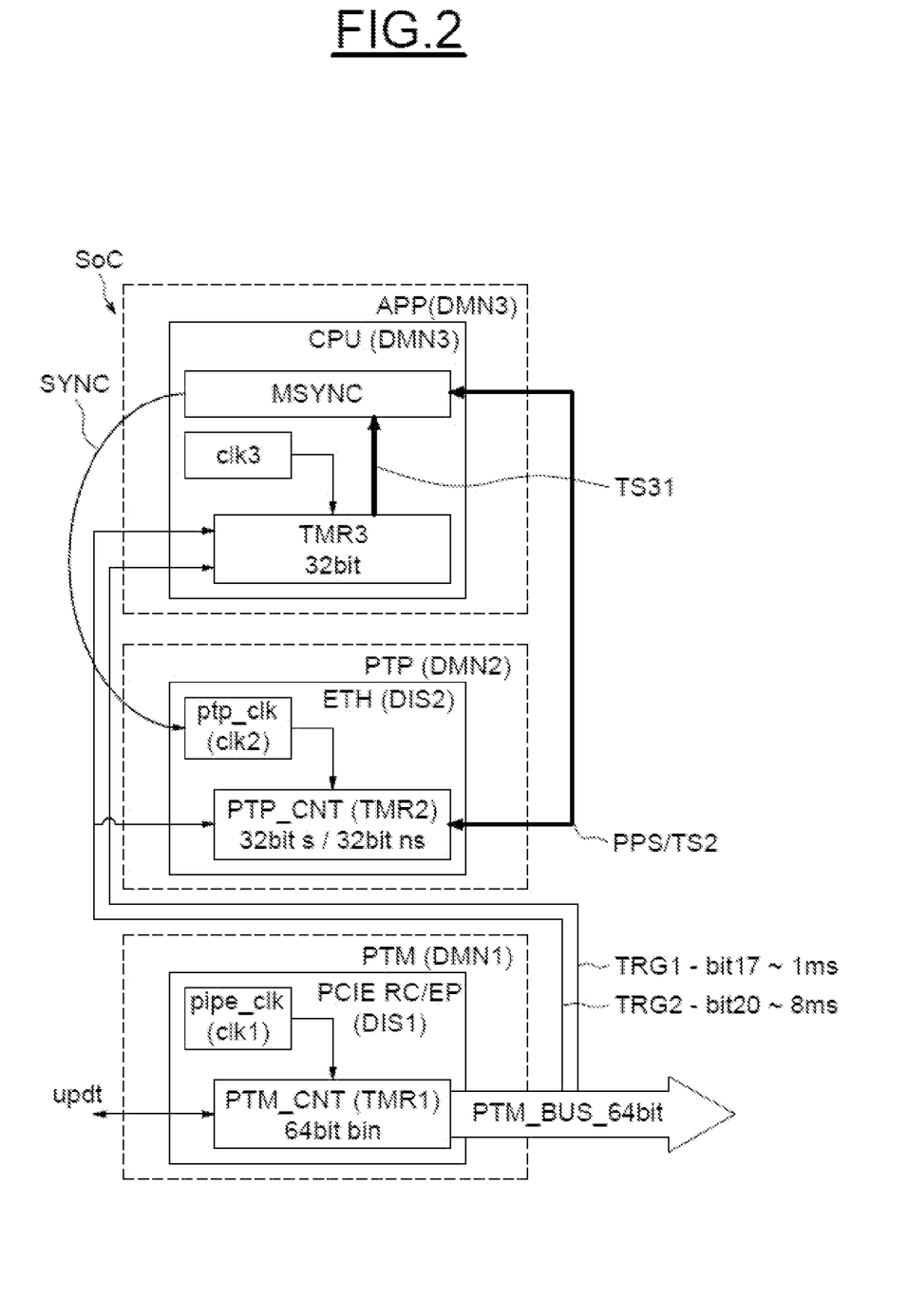
FIG. 2 illustrates an embodiment system on chip.

FIG. 2 illustrates a particular exemplary embodiment of the system on chip SoC, wherein the first device DIS1 is of the peripheral component interconnect express "PCIe" interface type, and wherein the second device DIS2 is of the wired network interface type "Ethernet."

The third device DIS3 is a calculation unit of the microprocessor or microcontroller central processing unit "CPU" type, including the synchronization module MSYNC produced in hardware or software form. The third time domain is a software application time domain APP (DMN3).

The PCIE interface (DIS1) is configured to share time information relating to the first time domain DMN1 by a precision time measurement "PTM" protocol.

In this context, the local clock pipe_clk (clk1) can for example have a frequency of 250 MHz (megaHertz), that is to say a period of 4 ns (nanoseconds), and the first counter PTM_CNT (TMR1) provides a 64-bit binary word, incremented by the timing of the local clock pipe_clk at 250 MHz. Consequently, the digital value of the first counter PTM_CNT (TMR1) corresponds to a time value in units of 4 ns.

In the PTM protocol, sharing time information is made by communicating each of the 64 bits of the current timestamp value PNT_CNT (TMR1) on a respectively dedicated channel of a timestamp bus PTM_BUS_64 bit. Consequently, the bus PTM_BUS_64 bit is at a constantly updated timestamp value.

Moreover, the first counter PTM_CNT (TMR1) is capable of receiving and emitting a synchronization update control updt, between various devices using the PTM protocol.

The Ethernet interface ETH (DIS2) is configured to share time information relating to the second time domain DMN2 by a Precision Time Protocol "PTP."

In this context, the local clock ptp_clk (c1$k$2) can for example have a frequency comprised between 125 MHz and 200 MHz, and the second counter PTP_CNT (TMR2) can comprise two 32-bit binary words, one encoding the seconds of the timestamp value (32 bit s), and the other encoding the nanoseconds of the timestamp value (32 bit ns).

In the PTP protocol, the sharing of time information can be done via registers of the Ethernet interface ETH (DIS2), storing a timestamp value TS2, and which are read by the synchronization module MSYNC. A signal usually called a pulse per second "PPS," but which is not necessarily limited to one pulse per second, can be configured to trigger a reading by the synchronization module MSYNC in the registers of the Ethernet interface ETH (DIS2) at desired instants.

Thus, in this example where the trigger time domain comprises the first time domain PTM (DMN1), that is to say according to the alternatives described above in relation to FIG. 1A or 1D, at least one periodic trigger event TRG1, TRG2 is generated by the first counter PTM_CNT (TMR1).

Advantageously taking advantage of the already existing construction of the bus PTM_BUS_64 bit in the PCIe interfaces, the periodic trigger events TRG1, TRG2 are defined by a transition (that is to say a rising edge or a falling edge) of at least one signal on the channels of the bus PTM_BUS_64 bit.

Indeed, the least significant bit of the bus PTM_BUS_64 bit constitutes a periodic signal with a period of 4ns, and in particular the bit of weight 17 (bit17) constitutes a periodic signal with a period close to 1 ms and the bit of weight 20 (bit20) constitutes a periodic signal with a period close to 8 ms, by the mechanism for incrementing the binary word of the first counter PTM_CNT (TMR1).

And, in this example, two separate trigger events TRG1, TRG2 are used, the first trigger event TRG1 occurring during a rising edge on the bit 17, and the second trigger event TRG2 occurring during a rising edge on the bit 20.

Furthermore, in an example not shown, each trigger event can be constructed by a logical condition on a transition of several bits of the current timestamp value distributed on the bus PTM_BUS_64 bit. This allows constructing "complex" trigger events having a periodicity which is not available in the signals passing over the timestamp bus PTM_BUS_64 bit as such. For example, a period close to 1.5 ms is not directly available on the bus PTM_BUS_64 bit, but can be roughly constructed by checking an "AND" condition on the rising edges of bit 17 and bit 16.

In the example shown, the two trigger events TRG1, TRG2 are detected by the synchronization module MSYNC, but only the second trigger event TRG2 (bit20) controls an acquisition of the PPS current timestamp value (TS2) representative of the instantaneous state of the second PTP time domain (DMN2).

Figure 3:
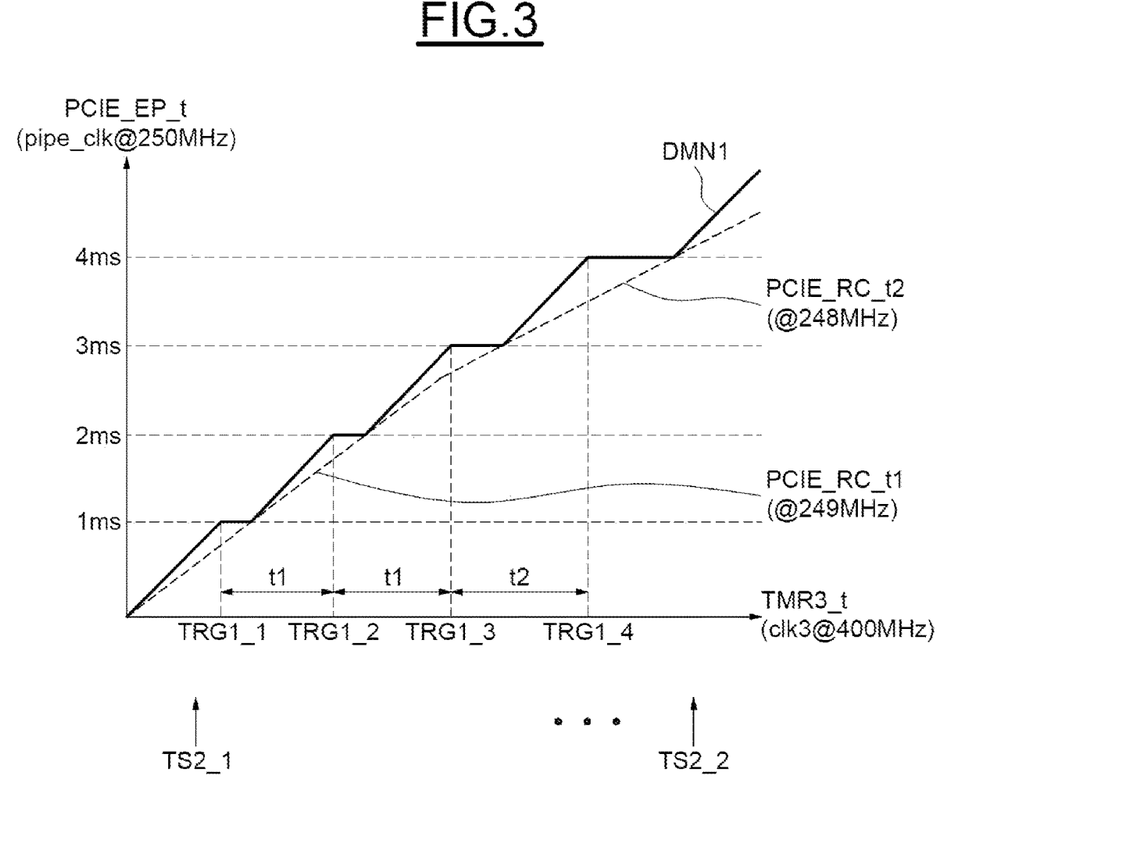
FIG. 3 is a graph illustrating a lapse of time in the first time domain compared to a lapse of time in the third time.

Reference is made in this regard to FIG. 3.

FIG. 3 is a graph showing the lapse of time in the first time domain DMN1 on the y-axis PCIE_EP_t, compared to the lapse of time in the third time domain APP (DMN3) on the x-axis TMR3_t.

The plateau in the lapse of time in the first time domain DMN1 shows an adjustment of the local clock pipe_clk (clk1) of the PCIe interface of the "End Point" EP type on an external clock of a PCIe interface of the "Root Complex" RC type.

The frequency of the external clock of the PCIe RC interface can vary for various reasons, as shown by the dotted lines PCIE_RC_t1, corresponding to 249 MHz, then by the dotted lines PCIE_RC_t2, corresponding to 248 MHz, while the local clock pipe_clk remains stable at a frequency of 250 MHz.

The advance of time PCIE_EP_t in the time domain of the PCIe EP interface relative to the time domain of the PCIe RC interface is compensated by substantially "stopping" the clock pipe_clk (clk1) during the plateau.

Advantageously, the PTM synchronizations of the PCIe EP interface on the PCIe RC interface are controlled by the third device CPU, via the signal updt (FIG. 2), after each first trigger events TRG1_1, TRG1_2, TRG1_3, TRG1_4.

Consequently, the slower the time domain of the PCIe RC interface, the greater the differential duration t1, t2 between the trigger events TRG1_i, t2>t1.

At the same time, the synchronization module MSYNC reads the current timestamp values TS2_1, TS2_2 representative of the instantaneous states of the second PTP time domain (DMN2) at the instants of detection of the second trigger events TRG2 (PPS).

The difference "TRG1_i+1−TRG1_i," that is to say the durations t1, t2 in the third time domain TMR3_t (DMN3), is used to discipline SYNC the local clock generator ptp_clk (c1k2) of the Ethernet interface ETH (DIS2) on the first PTM time domain (DMN1), by comparing it to the difference "TS2_j+1−TS2_j" of the current timestamp values supplied by the Ethernet interface ETH (DIS2).

In other words, a comparison is made in the third time domain, between a differential duration between successive trigger events TRG1_i (with 1≤i≤4 in FIG. 3), and a differential duration between current timestamp values acquired successively PPS_j (with 1≤j≤2 in FIG. 3), in order to synchronize the second time domain DMN2 with the first time domain DMN1.

Figure 4:
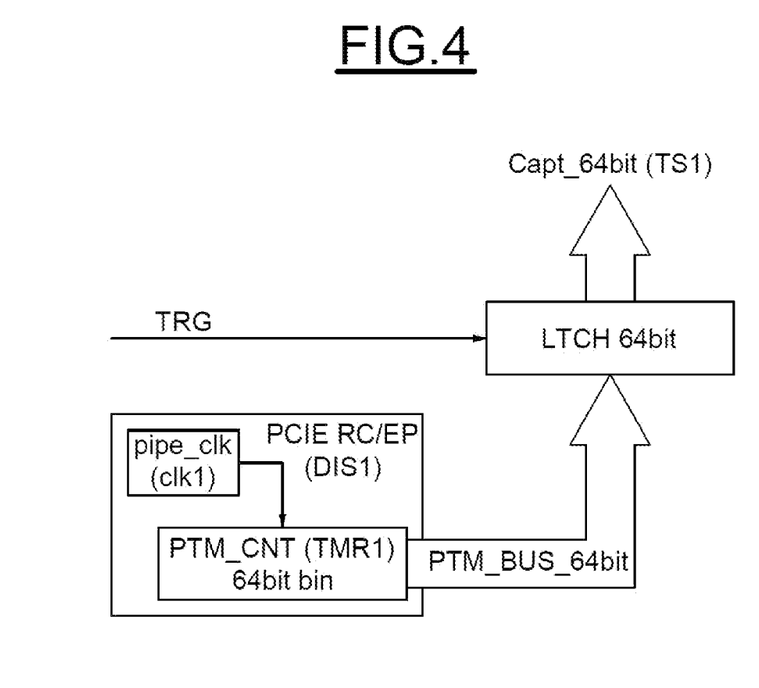
FIG. 4 illustrates an embodiment system on chip.

FIG. 4 shows an advantageous exemplary embodiment for the alternatives of the system on chip SoC described previously in relation to FIGS. 1B and 1C, that is to say the alternatives wherein the trigger time domain does not comprise the first time domain.

In this example, the first device PCIE RC/EP (DIS1) is again of the PCIe interface type, and the first counter PTM_CNT (TMR1) supplies a 64-bit binary word on a 64-bit timestamp bus PTM_BUS_64 bit, as previously described in relation to FIG. 2.

The synchronization module includes a 64-bit latch LTCH, on the respective channels of the timestamp bus PTM_BUS_64 bit, in order to acquire the current timestamp value Capt_64 bit (TS1) representative of the instantaneous state of the first time domain DMN1. A loading of the latch with the bits present on each channel of the timestamp bus PTM_BUS_64 bit is ordered at the instant of the at least one trigger event TRG, that is to say for example by the trigger event TRG itself.

This allows in particular not modifying the operation of the interface PCIe, whether of the EP or RC type, in particular with regard to the implementations of the PTM protocol with any other PCIe device external to the system on chip SoC.

What is claimed is:

1. A method for synchronizing a first time domain of a first device with a second time domain of a second device, the method comprising:
    detecting at least one periodic trigger event generated in at least one trigger time domain selected from the first time domain, the second time domain, and a third time domain of a third device;
    acquiring, at instants of detecting the at least one periodic trigger event, current timestamp values representing instantaneous states of the first time domain, the second time domain, and the third time domain, other than the at least one trigger time domain;
    comparing, in the third time domain, differential durations between the current timestamp values that are respectively acquired successively; and
    synchronizing the second time domain with the first time domain based on the comparing.

2. The method according to claim 1, wherein acquiring the current timestamp values is performed at same instants of detecting a same periodic trigger event, or at different instants of detecting different periodic trigger events.

3. The method according to claim 1, wherein the first time domain is defined by a precision time measurement protocol "PTM" of a peripheral component interconnect express "PCIe" interface, the second time domain is defined by a precision time protocol "PTP" of a network interface "Ethernet," and the third time domain is clocked by a free running local clock configured to clock software operations.

4. The method according to claim 1, wherein the at least one trigger time domain comprises the first time domain, and the at least one periodic trigger event generated in the first time domain occurs in response to a condition being verified on a transition of at least one bit of a current timestamp value representing the instantaneous state of the first time domain, each bit of the current timestamp value being communicated on a dedicated channel of a timestamp bus.

5. The method according to claim 1, wherein the at least one trigger time domain does not comprise the first time domain, each bit of the current timestamp value representing the instantaneous state of the first time domain being communicated on a dedicated channel of a timestamp bus, and the acquiring the current timestamp value representing the instantaneous state of the first time domain comprises loading a latch with bits present on each channel of the timestamp bus, the loading the latch being controlled at the instants of detecting the at least one periodic trigger event.

6. The method according to claim 1, wherein the at least one trigger time domain comprises the second time domain, and the at least one periodic trigger event generated in the second time domain is detected in response to a periodic signal being generated in the second time domain.

7. A system comprising:
    a first device comprising a first counter configured to provide a current timestamp value representing an instantaneous state of a first time domain;
    a second device comprising a second counter configured to provide a current timestamp value representing an instantaneous state of a second time domain; and a third device comprising:
a local clock generator configured to clock a third time domain; and
a synchronization module configured to:
detect at least one periodic trigger event generated in at least one trigger time domain selected from the first time domain, the second time domain and the third time domain;
acquire, at instants of detection of the at least periodic one trigger event, the current timestamp values representing the first time domain, the second time domain and the third time domain, other than the at least one trigger time domain;
compare differential durations between current timestamp values that are respectively acquired successively; and
generate a control configured to synchronize the second time domain with the first time domain, based on the comparison.

8. The system according to claim 7, wherein the synchronization module is configured to acquire the current timestamp values at same instants of detecting a same periodic trigger event, or at different instants of detecting different periodic trigger events.

9. The system according to claim 7, wherein the first device comprises a peripheral component interconnect express "PCIe" interface configured to define the first time domain by a precision time measurement "PTM" protocol, the second device comprises a network interface "Ethernet" configured to define the second time domain by a precision time protocol "PTP," and the local clock generator of the third device is configured to clock software operations.

10. The system according to claim 7, wherein the at least one trigger time domain comprises the first time domain, the first counter being configured to communicate each bit of the current timestamp value on a dedicated channel of a timestamp bus, and wherein the synchronization module is configured to detect the at least one periodic trigger event generated in the first time domain in response to a condition being verified on a transition of at least one bit on the respective channel of the timestamp bus.

11. The system according to claim 7, wherein the at least one trigger time domain does not comprise the first time domain, the first counter being configured to communicate each bit of the current timestamp value on a dedicated channel of a timestamp bus, and wherein the synchronization module comprises a latch on the timestamp bus and is configured to acquire the current timestamp value representing the instantaneous state of the first time domain by controlling loading of the latch, at the instants of the at least one periodic trigger event, with bits present on each channel of the timestamp bus.

12. The system according to claim 7, wherein the at least one trigger time domain comprises the second time domain, and the synchronization module is configured to detect the at least one periodic trigger event generated in the second time domain, in response to a periodic signal being generated in the second time domain.

13. A system on chip comprising:
a peripheral component interconnect express "PCIe" device comprising a first counter configured to provide a current timestamp value representing an instantaneous state of a first time domain;
an Ethernet device comprising a second counter configured to provide a current timestamp value representing an instantaneous state of a second time domain; and
a central processing unit "CPU" device comprising:
a local clock generator configured to clock a third time domain; and
a synchronization module configured to:
detect at least one periodic trigger event generated in at least one trigger time domain selected from the first time domain, the second time domain and the third time domain;
acquire, at instants of detection of the at least periodic one trigger event, the current timestamp values representing the first time domain, the second time domain and the third time domain, other than the at least one trigger time domain;
compare differential durations between current timestamp values that are respectively acquired successively; and
generate a control configured to synchronize the second time domain with the first time domain, based on the comparison.

14. The system on chip according to claim 13, wherein the synchronization module is configured to acquire the current timestamp values at same instants of detecting a same periodic trigger event, or at different instants of detecting different periodic trigger events.

15. The system on chip according to claim 13, wherein the PCIe device comprises a PCIe interface configured to define the first time domain by a precision time measurement "PTM" protocol, the Ethernet device comprises an Ethernet interface configured to define the second time domain by a precision time protocol "PTP," and the local clock generator of the CPU device is configured to clock software operations.

16. The system on chip according to claim 13, wherein the at least one trigger time domain comprises the first time domain, the first counter being configured to communicate each bit of the current timestamp value on a dedicated channel of a timestamp bus, and wherein the synchronization module is configured to detect the at least one periodic trigger event generated in the first time domain in response to a condition being verified on a transition of at least one bit on the respective channel of the timestamp bus.

17. The system on chip according to claim 13, wherein the at least one trigger time domain does not comprise the first time domain, the first counter being configured to communicate each bit of the current timestamp value on a dedicated channel of a timestamp bus, and wherein the synchronization module comprises a latch on the timestamp bus and is configured to acquire the current timestamp value representing the instantaneous state of the first time domain by controlling loading of the latch, at the instants of the at least one periodic trigger event, with bits present on each channel of the timestamp bus.

18. The system on chip according to claim 13, wherein the at least one trigger time domain comprises the second time domain, and the synchronization module is configured to detect the at least one periodic trigger event generated in the second time domain, in response to a periodic signal being generated in the second time domain.

19. The system on chip according to claim 13, wherein the CPU device is a microprocessor.

20. The system on chip according to claim 13, wherein the CPU device is a microcontroller.

* * * * *